Dec. 29, 1936.  W. M. BARRET ET AL  2,066,135
ELECTRICAL APPARATUS FOR LOCATING BODIES
HAVING ANOMALOUS ELECTRICAL ADMITTANCES
Filed Dec. 14, 1934   3 Sheets-Sheet 1

WITNESSES
Edw. Thorpe
A. L. Kitchin

INVENTORS
William M. Barret
Randolph H. Mayer
BY Munn, Anderson & Liddy
ATTORNEYS Dec. 29, 1936.  W. M. BARRET ET AL  2,066,135
ELECTRICAL APPARATUS FOR LOCATING BODIES
HAVING ANOMALOUS ELECTRICAL ADMITTANCES
Filed Dec. 14, 1934  3 Sheets-Sheet 2
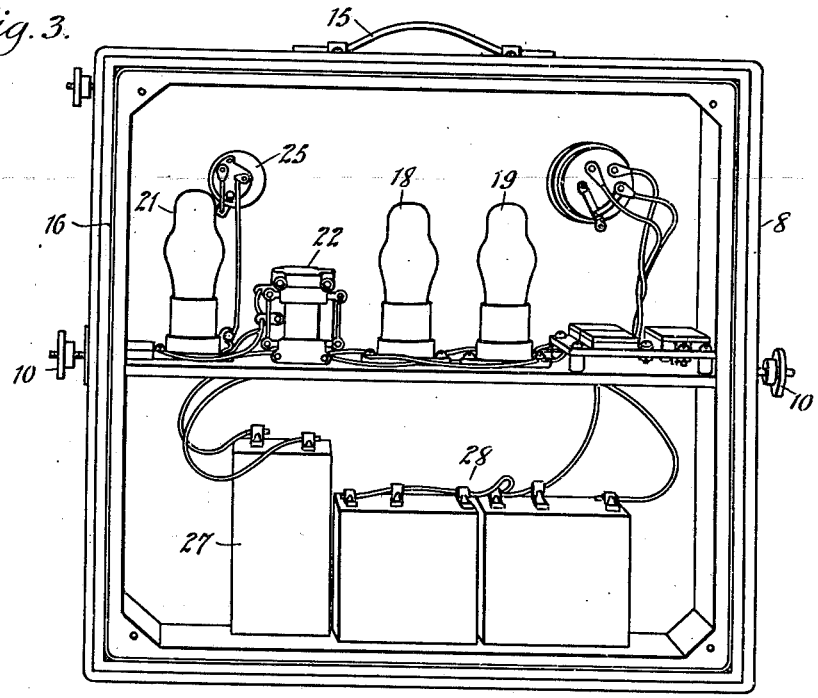
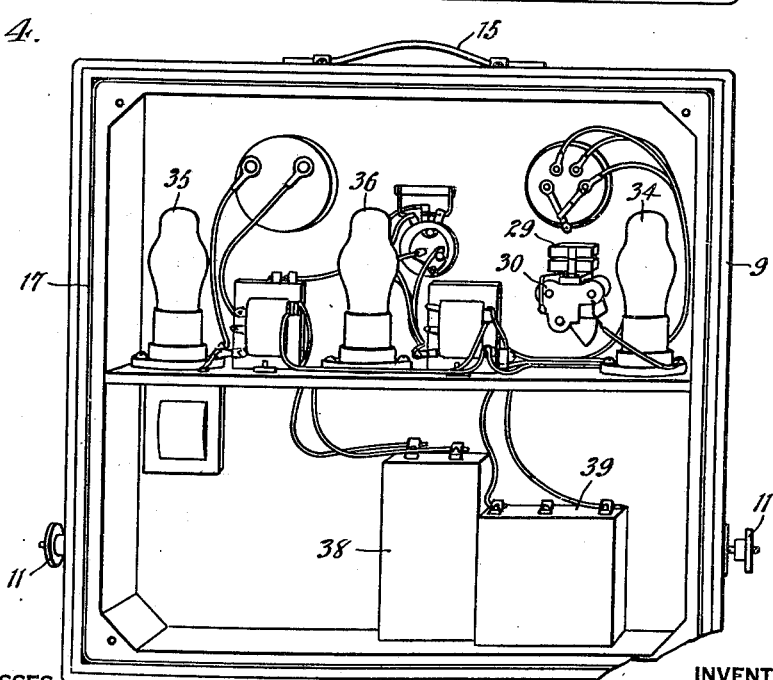
WITNESSES
Edw. Thorpe
A. L. Titchin
INVENTORS
William M. Barret
Randolph H. Mayer
Munn, Anderson & Leddy
ATTORNEYS Dec. 29, 1936.   W. M. BARRET ET AL   2,066,135
ELECTRICAL APPARATUS FOR LOCATING BODIES
HAVING ANOMALOUS ELECTRICAL ADMITTANCES
Filed Dec. 14, 1934   3 Sheets-Sheet 3

WITNESSES
Edw. Thorpe
A. L. Kitchin

INVENTORS
William M. Barret
Randolph H. Mayer
BY Munn, Anderson & Liddy
ATTORNEYS Patented Dec. 29, 1936

2,066,135

UNITED STATES PATENT OFFICE 2,066,135

ELECTRICAL APPARATUS FOR LOCATING BODIES HAVING ANOMALOUS ELECTRICAL ADMITTANCES

William M. Barret and Randolph H. Mayer, Shreveport, La., assignors to Engineering Research Corporation, Shreveport, La., a corporation of Louisiana Application December 14, 1934, Serial No. 757,526

5 Claims. (Cl. 175—182)

This invention relates to electrical apparatus for locating bodies having anomalous electrical admittances, the object being to provide an improved construction which will operate efficiently and which may be easily moved over the ground by a single person when in use.

Another object of the invention is to provide an apparatus of the character mentioned which may be knocked down and in knocked down condition readily stored or carried from place to place and then readily reassembled.

An additional object is to provide means for detecting the presence of masses whose electrical admittances differ from that of the surrounding media.

A still further and more specific object is to provide an apparatus for locating masses in the earth whose electrical admittances differ from that of the surrounding media, which utilizes an oscillator structure and a detector structure with means for maintaining these spaced apart and at certain angles to each other, so that the field produced by the oscillator may penetrate the earth and create an additional field if it engages an object or means whose electrical admittance differs from the surrounding media, and thereby vary the action of the field on the detector.

A further and more specific object or purpose of the apparatus is to provide means for detecting the presence of masses whose electrical admittances differ sufficiently from that of the surrounding media to vary an electrical field brought in contact therewith.

In the accompanying drawings—

Fig. 3 is a plan view of the oscillator shown in Fig. 1 with the rear plate removed;

Fig. 4 is a plan view of the detector shown in Fig. 1 with the rear plate removed;

Referring to the accompanying drawings by numeral, 1 and 2 indicate side bars which may be made of metal, wood or other material, and secured rigidly to these side bars are uprights 3 and 4 having looped portions at the upper ends to present grips 5 and 6, whereby hands may grasps these grips and carry the device over a field and at the same time watch the needle in galvanometer 7, to ascertain whether or not buried electrically conductive masses are influencing the device.

Figure 2:
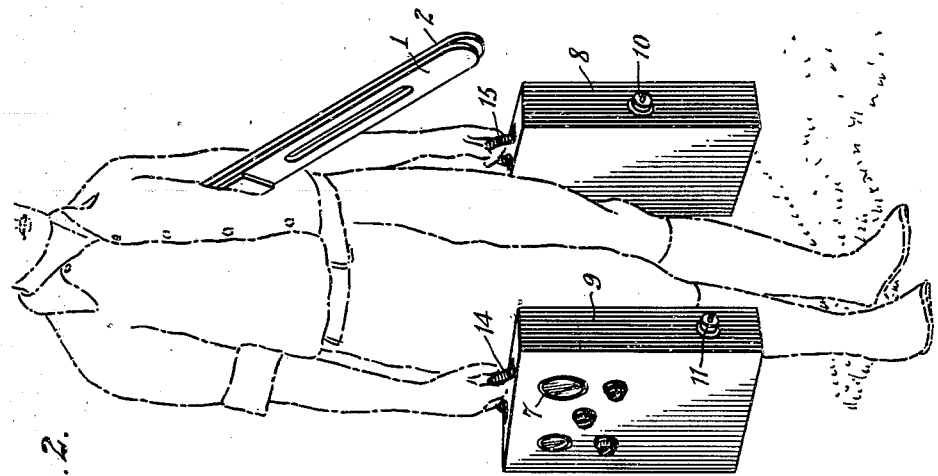
Fig. 2 is a view similar to Fig. 1 but showing the apparatus knocked down and ready to be carried from place to place.
Figure 1:
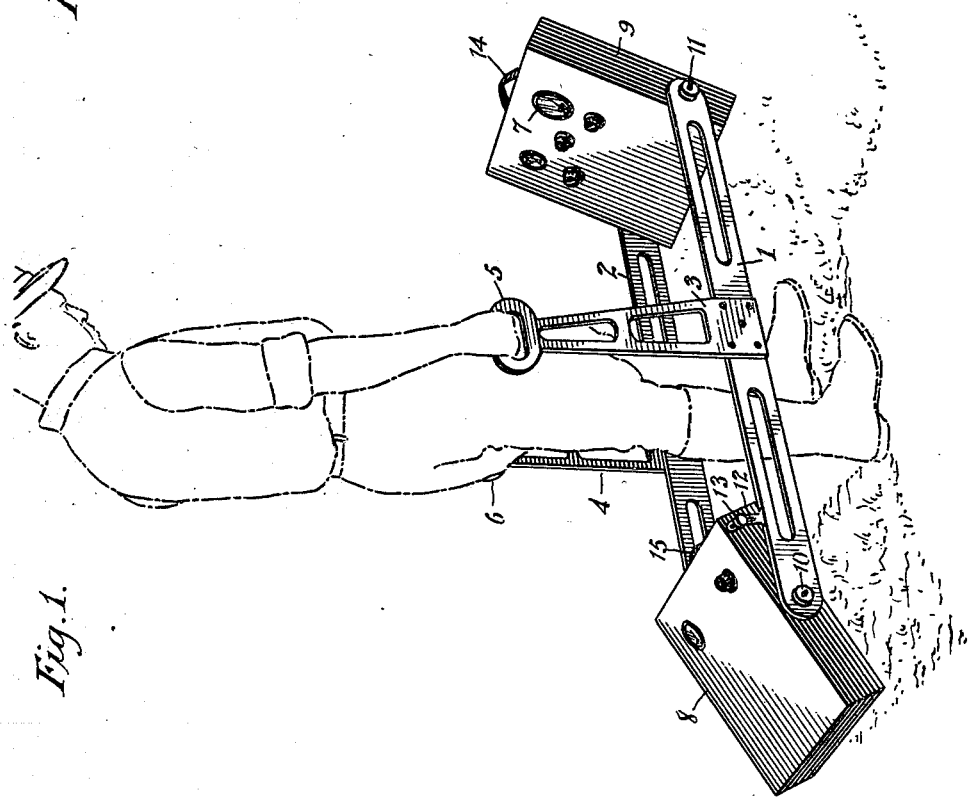
Figure 1 is a perspective view of the apparatus disclosing an embodiment of the invention, the same being shown in the position in which it is used and a figure in dot-and-dash lines illustrated in connection therewith.

As shown in Fig. 1, box 8 encloses the oscillator and box 9 encloses the detector. These boxes are secured to bars 1 and 2 by suitable means, as, for instance, clamping bolts 10 and 11. In addition to the bolts 10 and 11, there is provided an arc-shaped slotted member 12 accommodating the clamping screw 13, whereby the box 8 is held at a certain desired angle. The tension of bolts 11 holds the box 9 in a desired position. Ordinarily the boxes 8 and 9 are maintained in substantially the position shown in Fig. 1, as the device is moved over the ground. In this way the field produced by the oscillator in box 8 will cause the needle of galvanometer 7 to move to midway position and remain there, provided there is nothing in the earth which would affect the field produced by the oscillator. In case there is something in the earth which would vary the action of the field to make the same more intense or less intense, the needle of galvanometer 7 would indicate this fact. When an electrically conductive mass in the earth is brought into the effective range of the oscillator field, said mass causes a secondary field which reacts on the detector circuits and thereby causes a change in the reading of the galvanometer 7.

It will also be noted that the operation of the instrument is predicated on the presence of differential conductivities; namely, the conductivity of the material sought must differ sufficiently from that of the surrounding media to vary the action of the field on the detector, though none of the conductivities involved need be very high. By reason of this characteristic it is possible to locate various objects, as, for instance, exposed, buried, hidden or submerged objects which are conductors of electricity, such as silver, copper, gold, brass or other metals, either in a natural or a refined state, ore bodies, etc., as well as buried pipe lines which transport oil, gas, water or the like.

After a person has prospected with the apparatus as illustrated in Figure 1, he may disassemble the parts and grasp the straps 14 and 15 and carry the two boxes 8 and 9 as if they were grips, while the bars 1 and 2 and the uprights 3 and 4 may be carried under the arm. In this way the prospector may take the apparatus back to camp and the next day move to a new field of operation and again set up the device as shown in Figure 1. When the device is set up in this manner it is desirable to watch more or less closely the galvanometer 7 as the prospector walks over the field, whereby he may readily observe any variation in the field by the action of the needle or pointer of the galvanometer. If the prospector notices a slight variation in the position of the needle he may move back and forth in a straight line until he reaches the place where there is maximum variation. He may then turn to the right or left and move in a new direction so as to seek the greatest variation of the needle.

Also, if desired, the prospector may walk in a circle and after he has determined the spot where the greatest variation occurs he places a peg or other marker at that point, and then proceeds further with his prospecting. Later these marked spots may be dug up and something will be found which has a different conductivity from the surrounding media. When locating a pipe line the prospector may locate the line by this method and then follow in a direct line above the pipe line, as any movement off the pipe line will be indicated by movement of the needle in the galvanometer. In this way an old pipe line may be readily located and a map thereof produced.

In Figures 3 and 4 the interior of the boxes 8 and 9 are exposed. It will be noted that in the box 8 there is provided a loop or what may be termed an aerial 16, while in box 9 there is provided a small loop or aerial 17. As the various parts of the apparatus are shown in Figs. 5 and 6 in diagram, and also the circuits, the parts of the circuits will be described in respect to Figs. 5 and 6 particularly but the same reference numerals will apply as in Figs. 3 and 4.

Figure 5:
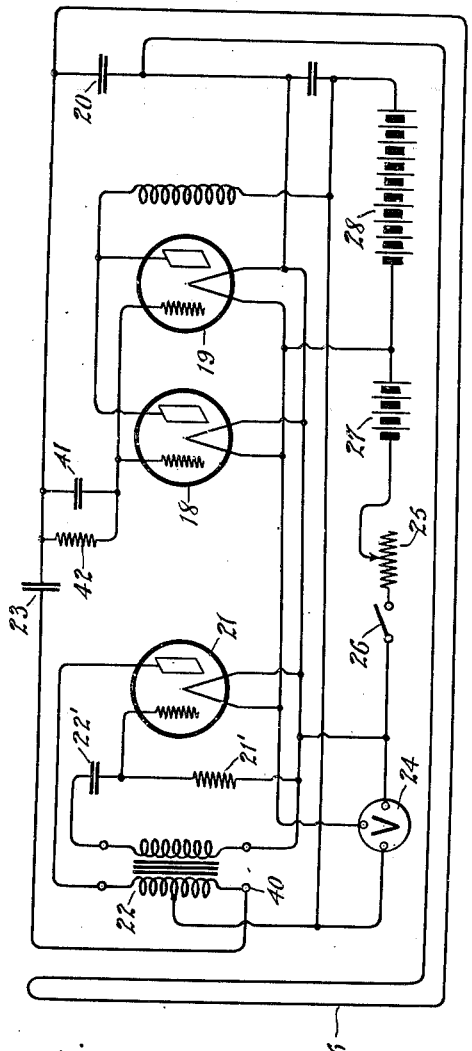
Fig. 5 is a diagram showing the wiring of the oscillator illustrated in Figs. 1 and 3.

The oscillator unit as shown in Fig. 5 is formed with a high frequency oscillator and a low frequency oscillator. The high frequency oscillator has the vacuum tubes 18 and 19 arranged in parallel and connected to the loop or aerial 16, there being provided a condenser 20 which is designed to give a wave length that has been found most effective. The low frequency oscillator consists of vacuum tube 21, an iron core transformer 22, which is connected to the grid and plate circuits of the vacuum tube 21. The high and low frequency oscillators are coupled to one another by the condenser 23. The remaining parts of the oscillator unit are of the usual design employed in a commercial manner, the same including a voltmeter 24, a variable resistor 25, a switch 26 and a battery 27, as well as a battery 28. When the switch 26 is closed the oscillator unit will begin to function and generate a field which will not only penetrate the earth but the air, and consequently will affect the loop or aerial 17 of the detector and cause the galvanometer 7 to function.

Figure 6:
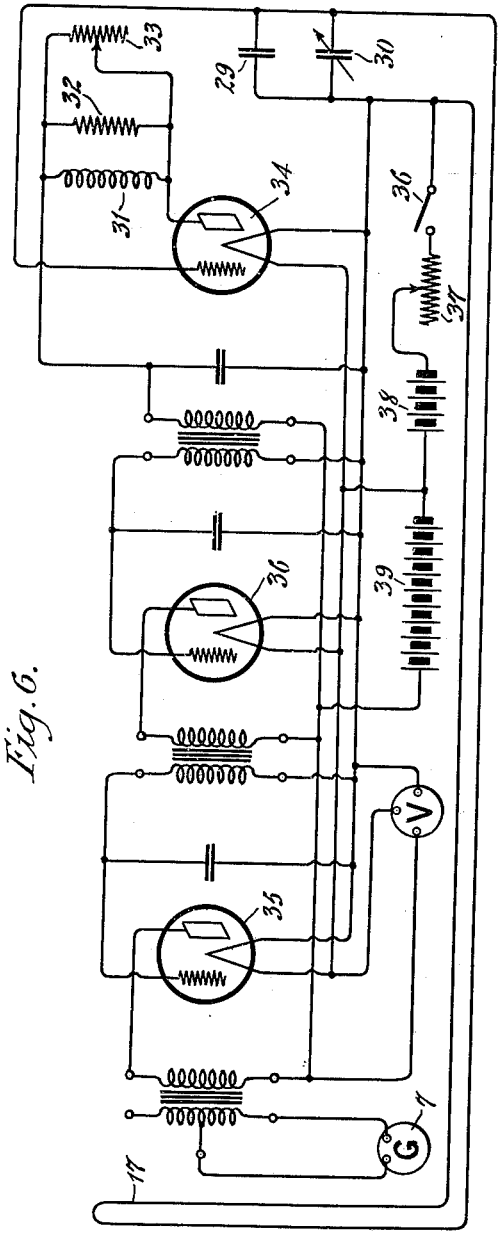
Fig. 6 is a diagram showing the wiring and associated parts of the detector shown in Figs. 1 and 4.

The detector as shown particularly in Figure 6 consists of a regenerative demodulator, a two-stage transformer-coupled audio amplifier whose output is measured with a rectifier-type galvanometer. The detector circuit includes the loop or aerial 17 which is tuned by the fixed condenser 29 and the variable condenser 30. Regeneration is secured through the plate coil 31 and is controlled by the fixed resistor 32 and the variable resistor 33. The output of the regenerative demodulator which employs vacuum tube 34 is amplified by a two-stage amplifier, using vacuum tubes 35 and 36, which are of the customary design, while the detector output is measured by the galvanometer 7. The remaining parts of the device are of conventional design, connected in the conventional way, the same including a hand switch 36, a variable resistor or rheostat 37, and the batteries 38 and 39.

When the device is in use the switch 26 is closed, and also the hand switch 36. The oscillator then produces a field which enters the surrounding media and if the field strikes a water pipe or other object which is of different conductivity from the surrounding media, a new field will be created, and a difference in the field at the detector will be produced, and, consequently, the pointer or needle of the galvanometer 7 will move in one direction or the other, thereby indicating to the prospector that the field has been disturbed.

By providing the galvanometer and placing the same as illustrated in Figure 1, a very desirable structure is presented which will immediately indicate to the eye certain facts. For instance, one of the characteristics of the galvanometer is to furnish a quantitative as well as a qualitative measure of the response caused by the disturbing body. This arrangement in connection with the general assemblage of the oscillator and the detector at certain angles in respect to each other and the earth results in decreasing extraneous influences which are principally electrostatic. The plane of the detector loop 17 may be varied as desired, but for ordinary work is at an angle of 63° from the horizontal. The angularity of the oscillator loop 16 is such as to cause the desired energy to be transferred between the oscillator and the detector units, whereby the needle or pointer on the galvanometer 7 will normally remain in a midposition until the field produced by the oscillator is disturbed.

In reference to the oscillator it will be seen that the modulator is made up of vacuum tube 21, transformer 22, resistor 21', and the fixed condenser 22'. By this arrangement a very suitable audio-frequency oscillator is secured and the reaction of the radio-frequency oscillator on the audio-frequency oscillator is minimized by the peculiar method of coupling the two oscillators. This coupling is secured by the two oscillators having a common filament battery and the condenser 23, one side of which is tied to the terminal 40 of transformer 22 and on the other side to the junction of the condenser 41 and the resistor 42. In the detector unit controlled regeneration is used, and the variable resistor 33 is the means used to secure the desired amount of regeneration.

We claim:

1. An electric apparatus for locating bodies having anomalous electrical admittances comprising an oscillator unit, a detector unit, each of said units having a housing, a pair of supporting bars, clamping screws for adjustably clamping said housings to said bars at the respective ends, said clamping means acting to hold said housings at a desired angle with respect to said bars, and a pair of uprights connected with said bars having handholds whereby a person may grasp the handles and move the device over the surface of the ground during the operation of the device.

2. A device of the character described, comprising a pair of supporting bars, an upright for each bar, each of said uprights having a handle at the free end whereby a person may grasp the handles and support the device, a housing pivotally connected to said bars at the respective ends thereof, means for clamping said housings at different angles with respect to said bars, an oscillator unit arranged in one of said housings, and a detector unit arranged in the other of said housings, said detector unit having a galvanometer facing toward the oscillator unit whereby the person carrying the device may see the action of the galvanometer at all times.

3. A device of the character described, including a detector loop, an oscillator loop, a galvanometer connected with said detector loop, and means for supporting said oscillator loop at a slight angle to the horizontal and said detector loop at a greater angle to the horizontal so that said galvanometer shows an immediate response when a conductive mass is brought within an effective range of the device or when any mass whose conductivity differs sufficiently from that of the surrounding earth is brought within the effective range of the device.

4. A device of the character described, comprising a pair of supports, means for holding said supports at different angles with respect to the earth when the device is in use, an oscillator unit arranged in one of said supports, and a detector unit arranged in the other of said supports, said detector unit having a galvanometer substantially facing toward the oscillator unit whereby a person may see the action of the galvanometer at all times.

5. An apparatus for locating bodies having anomalous electrical admittances comprising an oscillator unit, a detector unit, each of said units having a support, means acting to hold said supports at desired angles in respect to each other, and means connected with said supports adapted to be grasped by a person whereby the person may move the device over the ground during the operation thereof.

WILLIAM M. BARRET.
RANDOLPH H. MAYER.